(12) United States Patent
Niikawa

(10) Patent No.: US 11,204,576 B2
(45) Date of Patent: Dec. 21, 2021

(54) DRIVING APPARATUS AND IMAGE FORMING APPARATUS WITH IMPROVED DRIVE OUTPUT MEMBER MAINTAINABILITY

(71) Applicant: CANON KABUSHIKI KAISHA, Tokyo (JP)

(72) Inventor: Yusuke Niikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/268,252

(22) Filed: Feb. 5, 2019

(65) Prior Publication Data

US 2019/0250550 A1    Aug. 15, 2019

(30) Foreign Application Priority Data

Feb. 14, 2018    (JP) .............................. JP2018-024401

(51) Int. Cl.
*G03G 15/00* (2006.01)
*F16D 1/112* (2006.01)
*F16H 1/08* (2006.01)

(52) U.S. Cl.
CPC ........... *G03G 15/757* (2013.01); *F16D 1/112* (2013.01); *F16H 1/08* (2013.01)

(58) Field of Classification Search
USPC ....................................................... 399/167
See application file for complete search history.

(56) References Cited

U.S. PATENT DOCUMENTS

| 5,406,316 | A | * | 4/1995 | Schwiebert | ............ | B41J 11/002 |
| | | | | | | 346/25 |
| 5,634,178 | A | * | 5/1997 | Sugiura | ................ | G03G 15/757 |
| | | | | | | 399/107 |
| 6,175,706 | B1 | * | 1/2001 | Watanabe | ................ | F16D 1/101 |
| | | | | | | 399/167 |
| 2001/0021320 | A1 | * | 9/2001 | Murayama | ........... | G03G 21/185 |
| | | | | | | 399/117 |
| 2007/0273093 | A1 | * | 11/2007 | Takeuchi | ................ | B41J 13/103 |
| | | | | | | 271/265.01 |
| 2011/0017003 | A1 | * | 1/2011 | Taniguchi | .......... | G03G 15/5008 |
| | | | | | | 74/412 R |
| 2015/0212456 | A1 | | 7/2015 | Imaizumi | | |

(Continued)

FOREIGN PATENT DOCUMENTS

| CN | 1862410 A | 11/2006 |
| CN | 101963773 A | 2/2011 |
| CN | 101968086 A | 2/2011 |

(Continued)

OTHER PUBLICATIONS

Translation of KR100449702B1 to Kim, Jan. 2005. The translation is entitled: Driving Apparatus for Fixation (Year: 2005).*

*Primary Examiner* — Quana Grainger
(74) *Attorney, Agent, or Firm* — Canon U.S.A., Inc. I.P. Division

(57) ABSTRACT

A driving apparatus includes a drive output member configured to, when driving a member to be driven, receive a first force from the member to be driven in a direction in which the drive output member comes off a rotation shaft of a motor, and when driven by a drive transmission member, receive a second force from the drive transmission member in a direction opposite to that of the first force. The second force is equal to or greater than the first force.

16 Claims, 9 Drawing Sheets

(56) References Cited

U.S. PATENT DOCUMENTS

2016/0342134 A1* 11/2016 Shiori ................ G03G 21/1676

FOREIGN PATENT DOCUMENTS

| CN | 202205028 | A | | 4/2012 |
|----|-----------|---|---|--------|
| CN | 107074466 | A | | 8/2017 |
| JP | 2005164947 | A | * | 6/2005 |
| JP | 2013155779 | A | | 8/2013 |
| KR | 19990038548 | A | | 6/1999 |
| KR | 100449702 | B1 | * | 1/2005 |

* cited by examiner

DRIVING APPARATUS AND IMAGE FORMING APPARATUS WITH IMPROVED DRIVE OUTPUT MEMBER MAINTAINABILITY

BACKGROUND OF THE DISCLOSURE

Field of the Disclosure

The present disclosure relates to a driving apparatus including a motor that is a driving source used in an electrophotographic image forming apparatus.

Description of the Related Art

An image forming apparatus such as a copying machine and a printer includes a motor for driving a photosensitive drum, a fixing roller, or a sheet feed roller to rotate. The image forming apparatus uses a driving apparatus including a pinion gear that is a drive output member attached to the rotation shaft of the motor. As the pinion gear rotates, a gear that is a member to be driven in mesh with the pinion gear is driven. For improved image quality of printed images, the driving apparatus is desired to drive an image forming unit, such as a photosensitive drum, to rotate with high precision. For that purpose, the gear precision of the pinion gear that is the drive output member needs to be maintained.

Under the circumstances, a helical gear can be used as the pinion gear that is the drive output member of the driving apparatus. The pinion gear here receives a force in the thrust direction of the rotation shaft as a reaction force of driving when meshing with a driven gear that is the member to be driven. The thrust force can act on the pinion gear in a direction in which the pinion gear comes off the rotation shaft of the motor. In such a case, the pinion gear needs to be fixed not to come off the rotation shaft.

There have conventionally been techniques for ensuring the gear precision of the pinion gear that is the drive output member and fixing the pinion gear to the rotation shaft. Examples include the technique discussed in Japanese Patent Application Laid-Open No. 2013-155779. Japanese Patent Application Laid-Open No. 2013-155779 discusses ensuring sufficient press-in strength and gear precision as well by configuring the pinion gear so that its untoothed area having no gear tooth is pressed in and its toothed area having gear teeth is not pressed in in the thrust direction.

According to Japanese Patent Application Laid-Open No. 2013-155779, the rotation shaft is pressed into the pinion gear that is the drive output member. The pinion gear is therefore difficult to be detached from the motor and replaced for maintenance of the driving apparatus. If the gear teeth of the pinion gear that is the drive output member are damaged and only the pinion gear is desired to be replaced, the pinion gear and the motor then need to be replaced together. There have thus been issues concerning maintainability.

SUMMARY OF THE DISCLOSURE

According to an aspect of the disclosure, a driving apparatus includes a motor including a rotation shaft, a drive output member arranged on the rotation shaft and configured to drive a member to be driven, and a drive transmission member fixed to the rotation shaft and configured to engage with the drive output member and drive the drive output member by rotational movement of the rotation shaft. The drive output member is configured to, when driving the member to be driven, receive a first force from the member to be driven in a direction in which the drive output member comes off the rotation shaft, wherein the drive output member is configured to, when driven by the drive transmission member, receive a second force from the drive transmission member in a direction opposite to that of the first force. The second force is equal to or greater than the first force.

According to another aspect of the disclosure, a driving apparatus and an image forming apparatus include a drive output member arranged on a rotation shaft of a motor, and a drive transmission member.

Further features and aspects of the disclosure will become apparent from the following description of example embodiments with reference to the attached drawings.

DESCRIPTION OF THE EMBODIMENTS

Example embodiments of the disclosure will be described in detail below with reference to the drawings. Dimensions, materials, shapes, and relative arrangements of component parts of the example embodiments are subject to appropriate changes depending on configurations and various conditions of apparatuses to which the example embodiments of the disclosure are applied. The scope of the disclosure is by no means limited to the following example embodiments.

A first example embodiment will be described below. An outline of a driving apparatus according to the present example embodiment will be described by using an image forming apparatus, and an electrophotographic laser beam printer in particular, as an example.

(Example Image Forming Apparatus)

Figure 9:
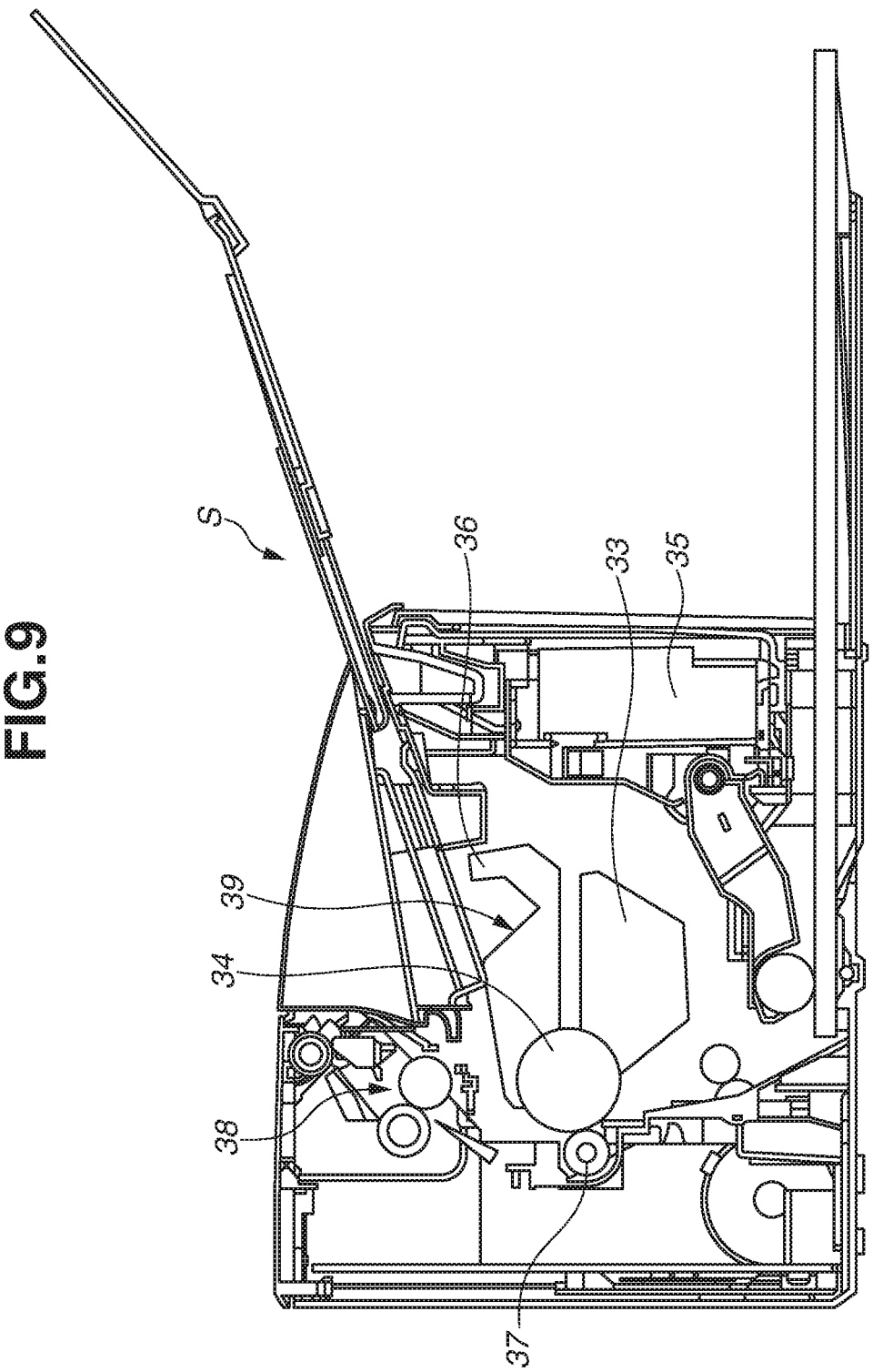
FIG. 9 is a schematic diagram illustrating an image forming apparatus according to the first example embodiment.

Before description of the driving apparatus, the laser beam printer will initially be described with reference to FIG. 9. FIG. 9 is a sectional view illustrating an overall configuration of an image forming apparatus S that is the laser beam printer.

An electrophotographic image forming portion performs image formation processes, for example, as follows: Initially, the surface of a photosensitive drum 34 is uniformly charged to predetermined polarity by using a charging unit. A latent image is then formed on the photosensitive drum 34 by using an exposure unit 35, such as a laser, based on image data on an image to be formed on a recording material.

The latent image formed on the photosensitive drum 34 is developed and visualized into a toner image by adhering toner to the latent image by using a developing unit 33. In such a state, the toner image is borne on the photosensitive drum 34.

The toner image formed on the photosensitive drum 34 is conveyed to a transfer nip formed between a transfer roller 37 and the photosensitive drum 34. Meanwhile, a recording material stored in the image forming apparatus S is conveyed to the transfer nip. In the transfer nip, the toner image on the photosensitive drum 34 is transferred to the recording material by application of a high voltage having polarity opposite to normal charging polarity of the toner.

Finally, the recording material to which the toner image has been transferred is conveyed to a fixing device 38, and the toner image is fixed to the recording material by application of heat and pressure. By such processes, the image is formed on the recording material.

The image forming portion is a portion for forming an image on a recording material, and includes at least the photosensitive drum 34, the charging unit, the developing unit 33, and a transfer unit.

After the transfer of the toner image, a small amount of adhering substances, such as toner of different polarity, remains on the photosensitive drum 34. The adhering substances are removed from the surface of the photosensitive drum 34 having passed the transfer nip by a cleaning unit 39. The photosensitive drum 34 then waits until next image formation.

The image forming apparatus S according to the present example embodiment includes a process cartridge into which the photosensitive drum 34, the charging unit, the developing unit 33, and the cleaning unit 39 described above, and a handle 36 are integrated. The process cartridge is detachably attached to an apparatus main body including a housing of the image forming apparatus S. The components to be integrated into a cartridge are not limited to those of the foregoing process cartridge. Examples of cartridges include a drum cartridge in which a drum that is a photosensitive drum and a cleaning unit are integrated, a developing cartridge in which a developing unit, such as a developing roller, and a developer storage portion are integrated, and a toner cartridge that is a developer storage portion configured to be singly detachable and attachable.
(Example Driving Apparatus)

Figure 2:
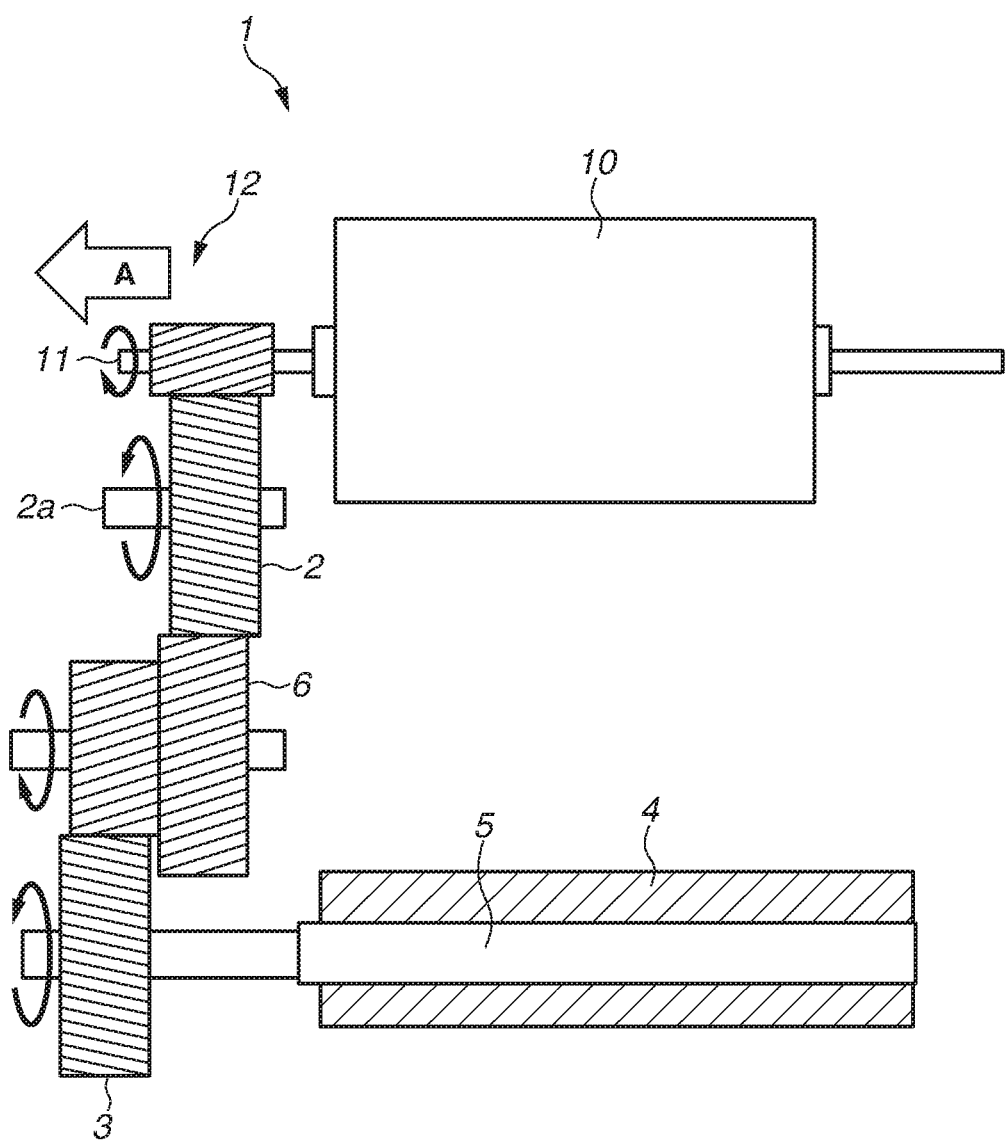
FIG. 2 is a schematic diagram illustrating the driving apparatus according to the first example embodiment.

FIG. 2 is a schematic diagram illustrating the driving apparatus according to the first example embodiment.

A driving apparatus 1 includes a motor 10 and a pinion gear 12 that is a drive output member arranged on a rotation shaft 11 of the motor 10. The pinion gear 12 that is the drive output member drives a driven gear 2 that is a member to be driven. FIG. 2 illustrates an example in which a gear train of a drive output gear 3 is driven. The pinion gear 12 that is the drive output member is arranged on the rotation shaft 11 of the motor 10. The driven gear 2 that is the member to be driven meshes with the pinion gear 12 that is the drive output member, and rotational movement of the rotation shaft 11 of the motor 10 is transmitted to the driven gear 2 via the pinion gear 12. The driven gear 2 that is the member to be driven is arranged on a rotation shaft 2a to be rotatable with respect to the rotation shaft 2a. The drive output gear 3 is a gear for driving a process cartridge 4. The drive output gear 3 meshes with the driven gear 2 via a reduction gear 6, and is integrally attached to a photosensitive drum 5 attached to the process cartridge 4 to be driven. More specifically, the drive output gear 3 is fixed to the shaft of the photosensitive drum 5.

When the motor 10 is driven, the rotation shaft 11 of the motor 10 and the pinion gear 12 rotate. The rotation force (torque) is transmitted to the photosensitive drum 5 via the driven gear 2, the reduction gear 6, and the drive output gear 3, whereby the photosensitive drum 5 is driven to rotate.

In the present example embodiment, the pinion gear 12 that is the drive output member and the driven gear 2 that is the member to be driven are helical gears. The large gear of the reduction gear 6 in mesh with the driven gear 2 is also a helical gear. Since the pinion gear 12 is a twisted gear, the pinion gear 12 receives a force in the thrust direction of the rotation shaft 11 from a driving reaction force when the pinion gear 12 meshes with the driven gear 2. The pinion gear 12 rotates in the direction illustrated in FIG. 2. The direction A in FIG. 2 is a direction in which the pinion gear 12 comes off the rotation shaft 11. The pinion gear 12 that is the drive output member twists in the leftward direction. The direction of rotation of the pinion gear 12 is set to clockwise (FIG. 2) when the motor 10 is seen from the pinion gear 12 side.

Figure 1A:
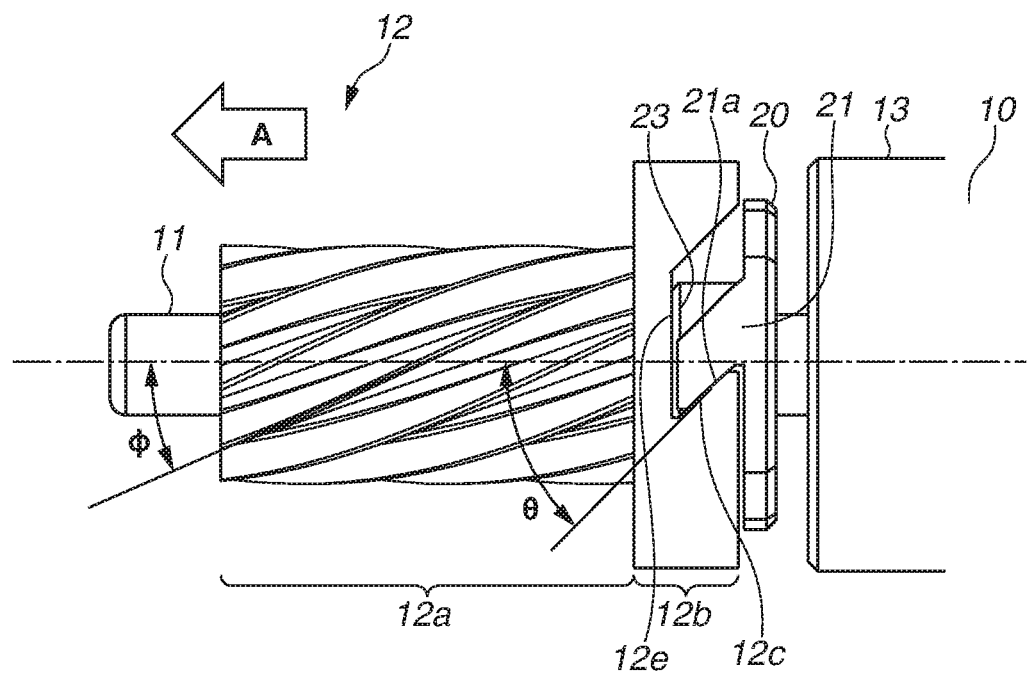
FIGS. 1A and 1B are schematic diagrams illustrating a vicinity of a pinion gear of a driving apparatus according to a first example embodiment.
Figure 1B:
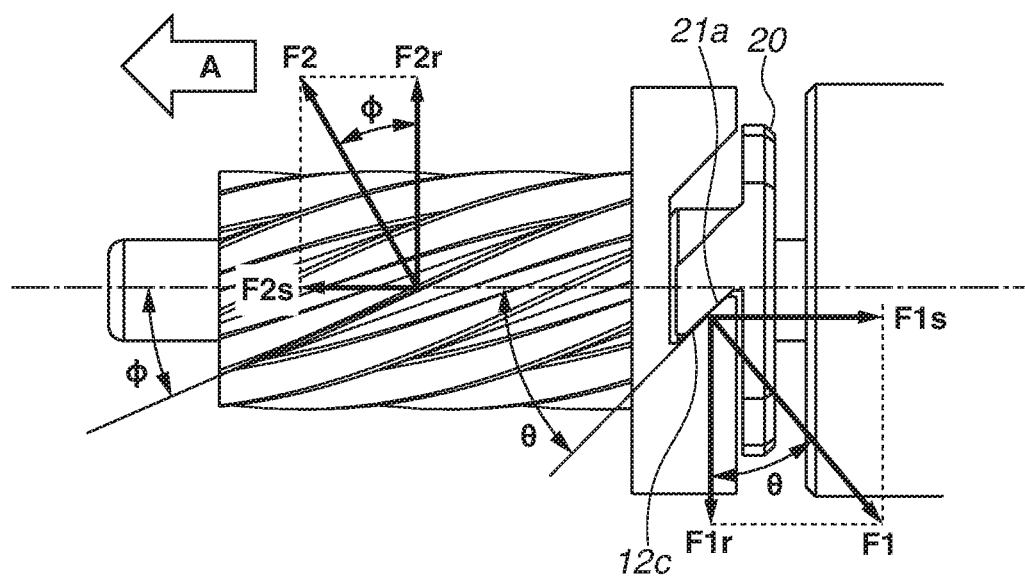
Figure 3A:
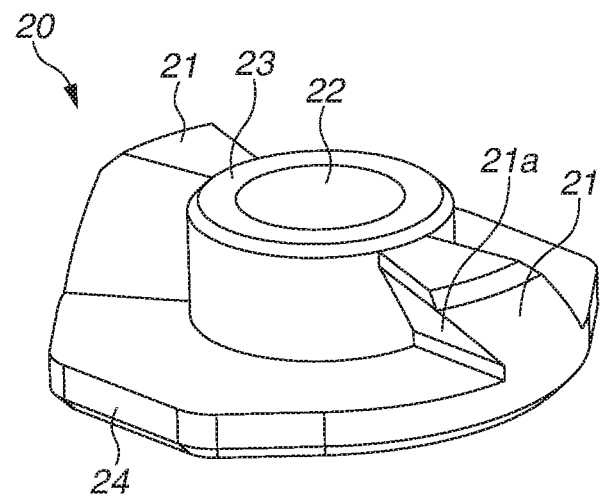
FIGS. 3A and 3B are perspective views of single parts of elements according to the first example embodiment.
Figure 3B:
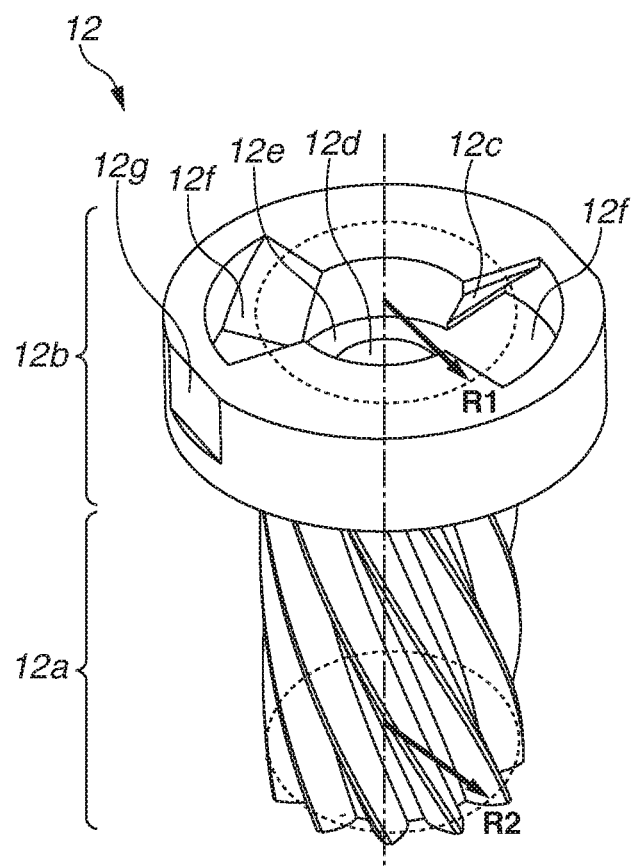
Figure 7:
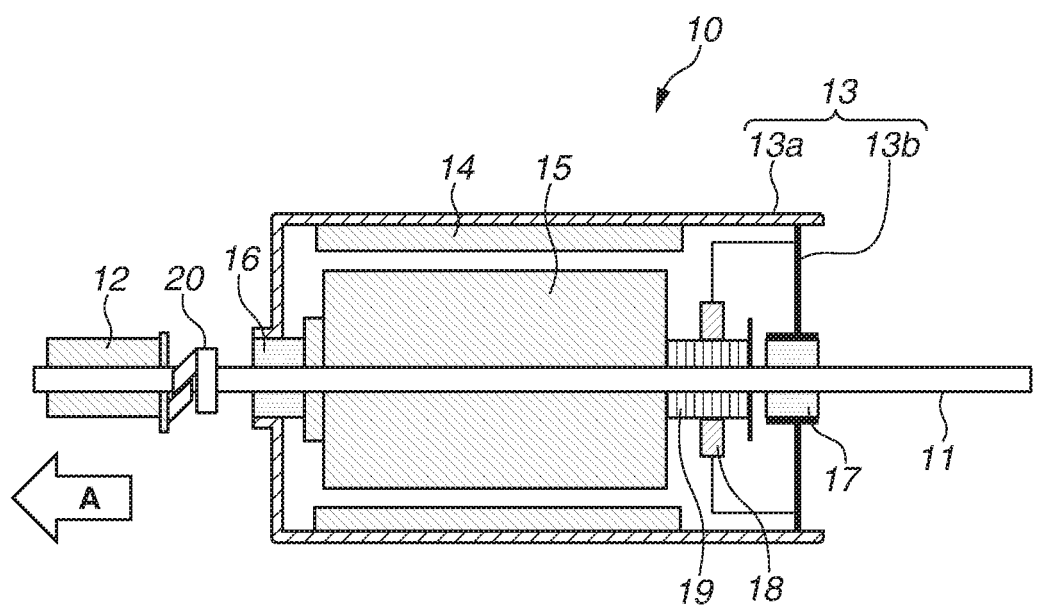
FIG. 7 is a sectional view of a motor according to the first example embodiment.

Next, a configuration of the driving apparatus 1 will be described with reference to FIGS. 1A, 1B, 3A, 3B, and 7. FIGS. 1A and 1B are schematic diagrams illustrating the vicinity of the pinion gear 12 of the driving apparatus 1 according to the first example embodiment. FIGS. 3A and 3B are perspective views of single parts of elements of the driving apparatus 1 according to the first example embodiment. FIG. 7 is a sectional view of the motor 10 according to first example embodiment.
(Example Configuration of Motor)

As illustrated in FIG. 7, the motor 10 is a direct-current (DC) brush motor including a case 13, a magnet 14, a rotor 15, the rotation shaft 11, a first bearing 16, a second bearing 17, and a brush 18. The outer diameter of the rotation shaft 11 depends on the size of the DC brush motor. A DC brush motor used in an image forming apparatus often includes a rotation shaft 11 having an outer diameter of 3 mm or so.

The case 13 is a hollow cylindrical case made of a metal material. The case 13 is formed to cover the outer peripheral portions of the motor 10. The case 13 can be divided into a case main body (stator) 13a and a lid (bracket) 13b. The magnet 14 is a permanent magnet attached to the inner peripheral surface of the case main body 13a. The rotor 15 is a rotor including an iron core, a winding wire, and a commutator 19. The rotation shaft 11 is one for outputting motor driving power. The rotor 15 is attached to the rotation shaft 11 and rotates integrally together therewith.

The first bearing 16 is attached to the case main body 13a and rotatably supports the rotation shaft 11 at the side where the pinion gear 12 is provided. The second bearing 17 is attached to the lid 13b and rotatably supports the rotation shaft 11 on the opposite side of the rotor 15 from the first bearing 16. Both the first and second bearings 16 and 17 are sintered bearings impregnated with lubrication oil. The brushes 18 are attached to the lid 13b. The brush 18 makes contact with the commutator 19 and supplies power to the rotor 15. The rotor 15 is installed between the first and second bearings 16 and 17 with backlash in the thrust direction.

If the commutator 19 comes into contact with the second bearing 17 during driving of the motor 10, the oil impregnated in the second bearing 17 seeps out and gets into the commutator 19. This can cause the brush 18 and the commutator 19 to malfunction. As a countermeasure against such a problem, the pinion gear 12 and the rotation shaft 11 are configured to receive a force in the thrust direction A during driving. As illustrated in FIG. 7, the rotor 15 is thus brought into contact with the first bearing 16 to leave a gap between the commutator 19 and the second bearing 17. This prevents the oil from getting into the commutator 19, and eliminates the concern about the malfunction.

(Example Configuration of Pinion Gear)

Next, a configuration around the pinion gear 12 that is the drive output member will be described.

As illustrated in FIG. 1A, a drive transmission member 20 is arranged on the rotation shaft 11 of the motor 10, between the case 13 and the pinion gear 12. In other words, the case 13, the drive transmission member 20, and the pinion gear 12 are arranged in this order from upstream to downstream in the direction in which the pinion gear 12 that is the drive output member comes off. The drive transmission member 20 has a role in transmitting the rotational movement of the rotation shaft 11 of the motor 10 (force for driving the pinion gear 12 that is the drive output member). The drive transmission member 20 is a metal part. For example, the drive transmission member 20 is formed by iron sintering or brass cutting. As illustrated in FIG. 3A, the drive transmission member 20 includes a hole 22, two protrusions 21, a contact surface 23, and rotation stop portions 24. The hole 22 fits with the rotation shaft 11 of the motor 10. The protrusions 21 are engagement portions for driving the pinion gear 12. The contact surface 23 comes into contact with the pinion gear 12 in the thrust direction. The rotation stop portions 24 are formed on the outer periphery of the drive transmission member 20. The two protrusions 21 that are the engagement portions are arranged circumferentially at almost equal distances when seen with the center of the hole 22 as the center of the circle. The protrusions 21 protrude from the base of the drive transmission member 20 in a rotation axis direction. Each protrusion 21 has an engagement surface 21a which is a tilted surface tilted with respect to the rotation shaft 11.

The pinion gear 12 is a resin molded article. The pinion gear 12 is molded from polyacetal (polyoxymethylene (POM)) which is commonly used for gears. As illustrated in FIG. 3B, the pinion gear 12 includes a hole 12d, a gear portion 12a, and a drive transmission portion 12b. The hole 12d fits with the rotation shaft 11. A gear is formed on the gear portion 12a. The drive transmission portion 12b includes a contact surface 12e and rotation stop portions 12g. The contact surface 12e comes into contact with the drive transmission member 20 in the thrust direction. The rotation stop portions 12g are arranged on the outer periphery of the drive transmission portion 12b. The drive transmission portion 12b of the pinion gear 12 further includes recesses 12f and engagement surfaces 12c. The recesses 12f are engagement portions for accommodating the protrusions 21 of the drive transmission member 20. The engagement surfaces 12c engage with the engagement surfaces 21a of the drive transmission member 20. Since the drive transmission member 20 includes two protrusions 21 and two engagement surfaces 21a arranged circumferentially at almost equal distances, the corresponding drive transmission portion 12b of the pinion gear 12 also include two recesses 12f and two engagement surfaces 12c arranged circumferentially at almost equal distances. If the drive transmission portion 12b of the pinion gear 12 is formed by resin molding and the vertical direction of FIG. 3B is the withdrawing direction of the mold cavity and core, the engagement surfaces 12c are undercuts with respect to the withdrawing direction. In forming the recesses 12f including the engagement surfaces 12c, the undercut shapes are then formed by using a rotating core. Alternatively, the engagement surfaces 12c may be formed by sliding slide cores.

As illustrated in FIG. 1A, the engagement surfaces 21a of the drive transmission member 20 and the engagement surfaces 12c of the pinion gear 12 are in contact and engagement with each other, whereby a rotation force (torque) is transmitted from the drive transmission member 20 to the pinion gear 12. The rotational movement of the rotation shaft 11 of the motor 10 rotates the drive transmission member 20, and the drive transmission member 20 engages with the pinion gear 12 that is the drive output member, whereby the pinion gear 12 is driven. The points at which the engagement surfaces 21a of the drive transmission member 20 and the engagement surfaces 12c of the pinion gear 12 make contact will be referred to as contact points or meshing points. In the present example embodiment, the engagement surfaces 12c are configured to constitute almost the same surfaces as the engagement surfaces 21a when the engagement surfaces 21a and 12c are engaged with each other. As described above, the pinion gear 12 according to the present example embodiment is a helical gear. The tilt direction of the engagement surfaces 12c of the pinion gear 12 and that of the engagement surfaces 21a of the drive transmission member 20 are therefore set to the same direction as the twist direction of the pinion gear 12.

(Example Attachment of Drive Output Member and Drive Transmission Member to Rotation Shaft of Motor)

The drive transmission member 20 is attached to the rotation shaft 11 by attaching the inner diameter portion of the hole 22 of the drive transmission member 20 to the outer diameter portion of the rotation shaft 11 by press-in force. The press-in strength is set above the assumed maximum torque of the motor 10. The drive transmission member 20 is thereby fixed to the rotation shaft 11 of the motor 10 and can sufficiently transmit the rotation force (torque) of the rotational movement of the rotation shaft 11 to the pinion gear 12. The drive transmission member 20 can thus drive the pinion gear 12.

To attach the pinion gear 12 to the rotation shaft 11, the inner diameter dimension of the hole 12d of the pinion gear 12 is set to be the same as or slightly smaller than the outer diameter dimension of the rotation shaft 11. This enables attachment without a fitting backlash between the hole 12d and the rotation shaft 11. The pinion gear 12 is arranged on the rotation shaft 11 and can be detached from the rotation shaft 11. If the pinion gear 12 wears out, the pinion gear 12 can be singly detached and replaced with a new one. This improves maintainability since the whole motor 10 does not need to be replaced together with the pinion gear 12.

Next, an assembly method for attaching the pinion gear 12 to the motor 10 with the drive transmission member 20 on the rotation shaft 11 of the motor 10 will be described with reference to FIGS. 4A and 4B.

Figure 4A:
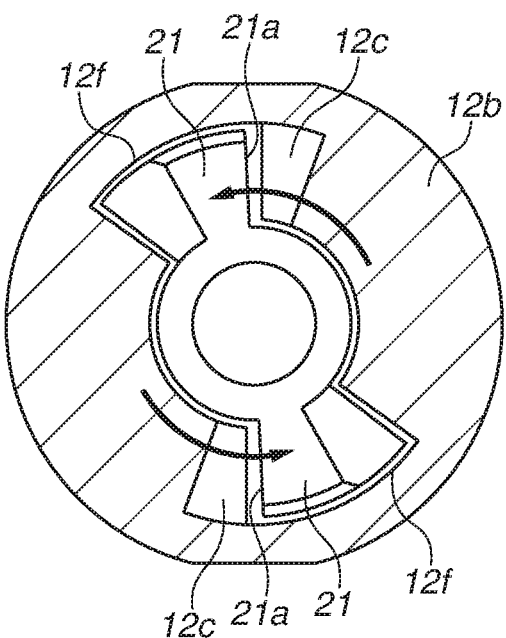
FIGS. 4A and 4B are schematic diagrams illustrating engagement between a drive output member and a drive transmission member according to the first example embodiment.
Figure 4B:
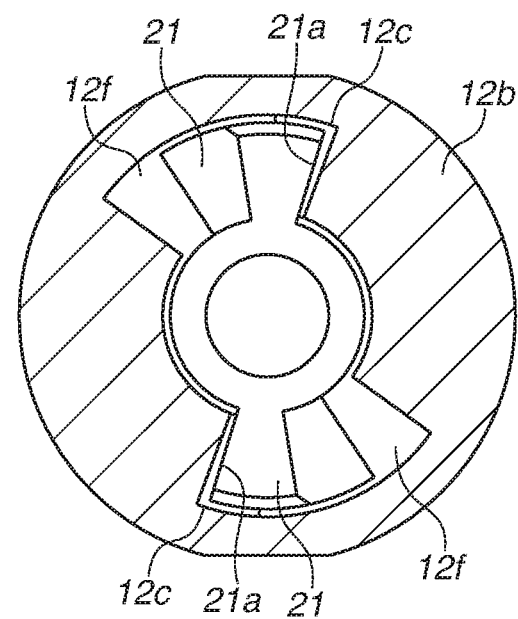

FIGS. 4A and 4B are schematic diagrams illustrating the engagement portions of the pinion gear 12 that is the drive output member and those of the drive transmission member 20 according to the first example embodiment.

As illustrated in FIG. 4A, the protrusions 21 of the drive transmission member 20 and the recesses 12f of the pinion gears 12 are initially positioned in phase with each other. With the phase maintained, the rotation shaft 11 is inserted into the pinion gear 12. Here, the rotation shaft 11 is fixed by pinching the rotation stop portions 24 of the drive transmission member 20 (FIG. 3A) with a not-illustrated tool. The pinion gear 12 is also fixed in phase by pinching the rotation stop portions 12g (FIG. 3B) with a not-illustrated tool.

The rotation shaft 11 is inserted into the pinion gear 12 in the rotation axis direction until the contact surface 12e of the pinion gear 12 comes into contact with the contact surface 23 of the drive transmission member 20. The contact surface 12e of the pinion gear 12 and the contact surface 23 of the drive transmission member 20 are in a positional relationship orthogonal to the rotation axis direction. With the contact surfaces 12e and 23 in contact with each other, the pinion gear 12 is then rotated with respect to the rotation shaft 11 so that the engagement surfaces 12c of the pinion gear 12 come into contact with the engagement surfaces 21a of the drive transmission member 20. As illustrated in FIG. 4A, when the motor 10 is seen from the pinion gear 12 side, the pinion gear 12 is rotated counterclockwise. The attachment of the pinion gear 12 is completed when the engagement surfaces 12c and 21a come into contact with each other as illustrated in FIG. 4B.

The pinion gear 12 can be detached from the rotation shaft 11 by reversely performing the foregoing procedure.

Next, an operation around the pinion gear 12 while the driving apparatus 1 is in operation will be described.

As described above, the rotation shaft 11 of the motor 10 is pressed into the drive transmission member 20 with sufficient strength. Meanwhile, the pinion gear 12 is attached to the rotation shaft 11 without a fitting backlash, and can thus be detached therefrom. As illustrated in FIG. 1A, the pinion gear 12 and the drive transmission member 20 are in contact with each other in the thrust direction at the respective contact surfaces 12e and 23. In the direction of rotation, the pinion gear 12 and the drive transmission member 20 are in contact with each other at the respective engagement surfaces 12c and 21a tilted with respect to the rotation shaft 11.

FIG. 1B illustrates forces acting on the pinion gear 12. The rotational movement of the rotation shaft 11 of the motor 10 is transmitted to the drive transmission member 20 to which the rotation shaft 11 is pressed in with sufficient strength. In other words, the rotational movement of the rotation shaft 11 of the motor 10 drives the drive transmission member 20. The pinion gear 12 that is the drive output member is then driven via the contact points between the engagement surfaces 21a of the drive transmission member 20 and the engagement surfaces 12c of the pinion gear 12 that is the drive output member. A force F1 acting on the pinion gear 12 via an engagement surface 12c of the pinion gear 12 and an engagement surface 21a of the drive transmission member 20 is resolved into a force $F1r$ in the circumferential direction of a circle around the rotation shaft 11 and a force $F1s$ in the thrust direction (or rotation axis direction). The relationship between F1, $F1s$, and $F1r$ is given by the following equations:

$$F1s = F1 \sin \theta \quad (1) \text{ and}$$

$$F1r = F1 \cos \theta \quad (2)$$

where $\theta$ is the tilt angle of the engagement surface 12c of the pinion gear 12 and the engagement surface 21a of the drive transmission member 20.

The pinion gear 12 according to the present example embodiment is a helical gear. The pinion gear 12 meshes with the driven gear 2 and receives a reaction force (driving reaction force) of the force driving the driven gear 2. The driving reaction force will be denoted by F2. The driving reaction force F2 is similarly resolved into a force $F2r$ in the circumferential direction of the circle around the rotation shaft 11 and a force $F2s$ in the thrust direction (or rotation axis direction). The relationship between F2, $F2s$, and $F2r$ is given by the following equations:

$$F2s = F2 \sin \phi \quad (3) \text{ and}$$

$$F2r = F2 \cos \phi \quad (4)$$

where $\phi$ is the helix angle of the pinion gear 12. Torque transmitted from the drive transmission member 20 to the pinion gear 12 that is the drive output member by the circumferential force $F1r$ will be denoted by T1. Torque transmitted from the pinion gear 12 to the driven gear 2 by the circumferential force $F2r$ will be denoted by T2. Without torque loss, T1 and T2 have the same magnitude (T1=T2). The relationship between T1 and T2 is given by the following equation:

$$T1 = F1rR1 = F2rR2 = T2 \quad (5)$$

where R1 is a distance from the contact point on the engagement surface 12c of the pinion gear 12 to the rotation center of the rotation shaft 11 of the motor 10 (FIG. 3B), and R2 is a meshing pitch circle radius of the pinion gear 12 (FIG. 3B).

Substituting Eqs. (2) and (4) into Eq. (5) yields the relationship of the following equation:

$$F1R1 \cos \theta = F2R2 \cos \phi \quad (6)$$

The force $F1s$ in the thrust direction is directed opposite to the direction A in which the pinion gear 12 comes off in the present example embodiment. In other words, the force $F1s$ in the thrust direction acts in the direction in which the pinion gear 12 is drawn so that the pinion gear 12 does not come off the rotation shaft 11 of the motor 10. Meanwhile, the force $F2s$ in the thrust direction is in the same direction as the direction A. In other words, the force $F2s$ in the thrust direction is a force in the direction in which the pinion gear 12 comes off the rotation shaft 11. To prevent the pinion gear 12 from coming off the rotation shaft 11, the two forces F1s and F2s in the thrust direction can satisfy a relationship of $F1s \geq F2s$. Under such a condition, the relationship of the following expression can be derived from Eqs. (1) and (3):

$$F1 \sin \theta \geq F2 \sin \phi \quad (7)$$

Solving Eq. (6) for F2 and substituting the result into Exp. (7) yields the relationship of the following expression:

$$R2 \tan \theta \geq R1 \tan \phi \quad (8)$$

If R1 and R2 are the same, Exp. (8) can be satisfied by making the tilt angle $\theta$ of the engagement surface 12c of the pinion gear 12 and the engagement surface 21a of the drive transmission member 20 the same as the helix angle $\phi$ of the pinion gear 12. If R1 and R2 are the same, Exp. (8) can also be satisfied by making the tilt angle $\theta$ greater than the helix angle $\phi$ of the pinion gear 12 ($\theta > \phi$). In other words, the pinion gear 12 can be thereby retained to not come off the rotation shaft 11 of the motor 10. For example, if the pinion gear 12 has a helix angle of 20°, the tilt angle of the engagement surface 12c of the pinion gear 12 and the engagement surface 21a of the drive transmission member 20 can be set to 45°.

If the pitch circle diameter R2 of the pinion gear 12 is greater than the distance R1 from the contact point on the engagement surface 12c to the rotation center of the rotation shaft 11, the tilt angle $\theta$ of the engagement surfaces 12c and 21a and the helix angle 4 of the pinion gear 12 may be the same. Even in such a case, the pinion gear 12 can be retained to not come off the rotation shaft 11.

In such a case, the tilt angle θ of the engagement surfaces 12c and 21a and the helix angle θ of the pinion gear 12 both can be set to 20°. If the drive transmission member 20 is fabricated by sintering, the engagement surfaces 21a tilted at 20° can be molded by using a rotation core. This facilitates the fabrication by sintering because molding using a rotation core becomes difficult at large tilt angles.

As described above, the pinion gear 12 receives the force F2s in the direction where the pinion gear 12 comes off in the thrust direction and the force F1s in the direction where the pinion gear 12 is drawn in the thrust direction. F1s≥F2s can be satisfied by adjusting conditions such as the helix angle θ of the pinion gear 12 and the tilt angle θ of the engagement surfaces 12c and 21a. The pinion gear 12 can be retained on the rotation shaft 11 not to come off. Since the pinion gear 12 can be retained without pressing the rotation shaft 11 into the pinion gear 12, a driving apparatus having excellent maintainability can be provided.

The tilted engagement surfaces 21a and 12c are provided on the drive transmission member 20 and the pinion gear 12, respectively. This enables the drive transmission member 20 to function as a retainer for the pinion gear 12 even if the drive transmission member 20 is installed on the base side of the pinion gear 12 in the rotation axis direction. The position of the pinion gear 12 with respect to the drive transmission member 20 in the thrust direction is determined by the contact between the contact surfaces 12e and 23 and the contact between the engagement surfaces 12c and 21a. The pinion gear 12 thus produces no backlash with respect to the drive transfer member 20 in the thrust direction. Even if a torque variation occurs during driving, the pinion gear 12 therefore does not move in the thrust direction, whereby a displacement of the driving target (photosensitive drum 5) in the direction of rotation can be suppressed.

In the present example embodiment, the tilted engagement surfaces 21a and 12c are provided on the drive transmission member 20 and the pinion gear 12, respectively. However, similar effects can be obtained by providing tilted engagement surfaces on either one of the drive transmission member 20 and the pinion gear 12, and replacing the engagement surfaces of the other with parallel pins of cylindrical shape. The parallel pins may have a shape other than the cylindrical shape.

The pinion gear 12 and the drive transmission member 20 can function with only one engagement surface 12c and one engagement surface 21a, respectively. The pinion gear 12 and the drive transmission member 20 may each include two engagement surfaces as in the present example embodiment, or even three or more engagement surfaces provided circumferentially. The provision of a plurality of engagement surfaces enables more smooth torque transmission from the drive transmission member 20 to the pinion gear 12, whereby the pinion gear 12 is driven more smoothly. Since the load on the individual engagement surfaces can be distributed, the engagement surfaces 21a and 12c can be reduced in height in the thrust direction, and the pinion gear 12 and the drive transmission member 20 can be reduced in size in the thrust direction.

If the rotation shaft 11 of the motor 10 has an outer diameter as small as about 3 mm, a side hole, knurling, an I-cut, or a D-cut may be formed in/on the rotation shaft 11 for the purpose of attaching the drive transmission member 20. Such machining, however, can lower the strength of the rotation shaft 11 of the motor 10 or cause shaft runout. The drive transmission member 20 then can be attached to the rotation shaft 11 of the motor 10 by press-in with strength sufficient to transmit the rotational movement without machining the rotation shaft 11.

To attach the pinion gear 12 to the rotation shaft 11, the inner diameter dimension of the hole 12d of the pinion gear 12 is set to be the same as or slightly smaller than the outer diameter dimension of the rotation shaft 11 so that the pinion gear 12 is attached without a fitting backlash between the hole 12d and the rotation shaft 11. The absence of the fitting backlash can suppress transmission errors between the pinion gear 12 and the driven gear 2.

A difference between the inner diameter of the hole 12d and the outer diameter of the rotation shaft 11 can be made small than that for press-in. The force for attaching the pinion gear 12 to the rotation shaft 11 (detaching the pinion gear 12 from the rotation shaft 11) can thereby be suppressed, compared to the force for press-in. This can improve maintainability. Deformation of the pinion gear 12 attached to the rotation shaft 11 can also be suppressed, whereby degradation in the gear precision can be suppressed.

The configuration that the rotational movement of the rotation shaft 11 is transmitted to the pinion gear 12 via the drive transmission member 20 eliminates the need to press the rotation shaft 11 into the pinion gear 12. In other words, the rotational movement does not need to be directly transmitted from the rotation shaft 11 of the motor 10 to the pinion gear 12. The material of the pinion gear 12 is therefore not restricted in terms of press-in strength, and the degree of freedom of the material increases. Even resin materials can be used. Compared to a pinion gear 12 made of metal, the pinion gear 12 made of POM, which is commonly used for gears, can suppress transmission errors caused by meshing with the driven gear 2 and can reduce driving noise as well.

Since the rotation stop portions 24 are provided on the drive transmission member 20, the rotation shaft 11 can be fixed without directly fixing the rotation shaft 11 by a tool when the pinion gear 12 is attached to and detached from the motor 10. Directly fixing the rotation shaft 11 by a tool can aggravate shaft runout and cause uneven rotation of the motor 10. The provision of the rotation stop portions 24 eliminates such concerns.

The present example embodiment can provide a driving apparatus including a pinion gear 12 of excellent maintainability even for a DC brush motor with a rotation shaft having an outer diameter as small as about 3 mm. The present example embodiment can also be applied to other types of motors such as a DC brushless motor and a stepping motor.

In the present example embodiment, the direction of the thrust force acting on the rotation shaft 11 of the motor 10 is determined so that the commutator 19 does not come into contact with the second bearing 17. However, the direction of the thrust force can be determined by other structural restrictions of the motor 10 itself. There can be restrictions on the directions of thrust forces of the gears downstream of the driving system, such as the driven gear 2, and the direction of the thrust force acting on the rotation shaft 11 can be determined as a result of such restrictions.

The present example embodiment has been described by using the image forming apparatus S as an example. However, the driving apparatus according to the present example embodiment is not limited to an image forming apparatus and may be applied to various mechanical devices.

Figure 5:
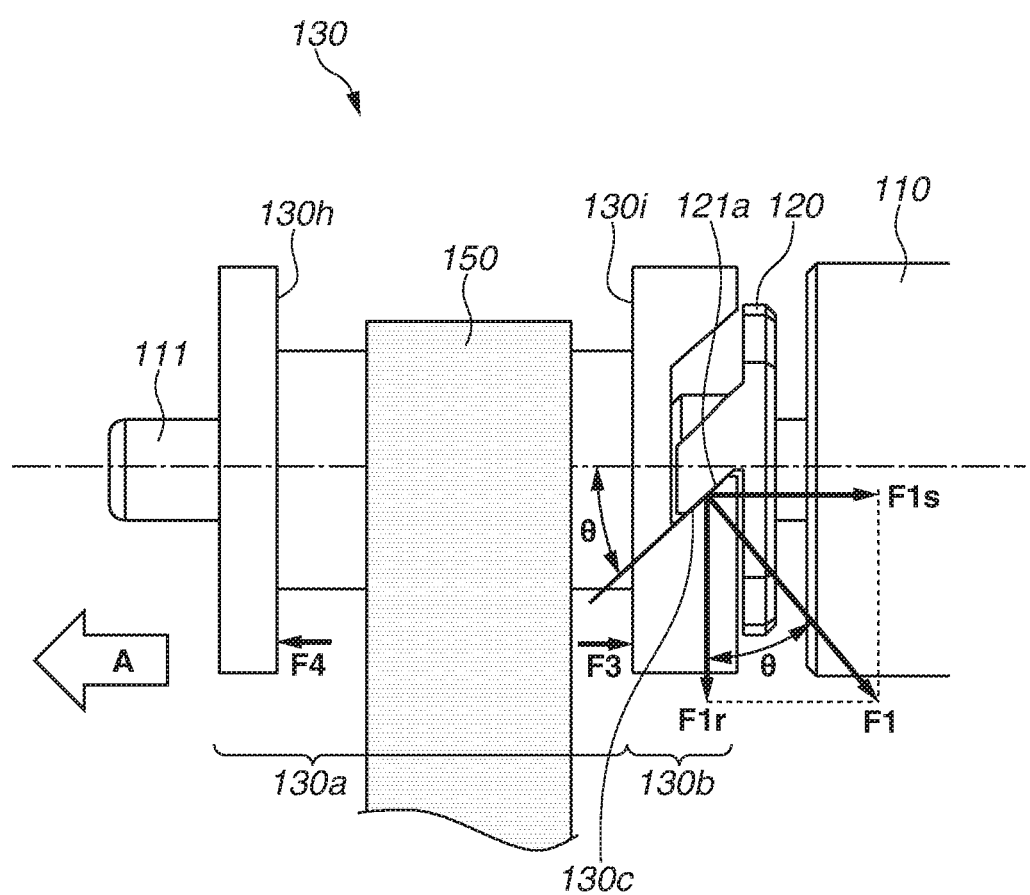
FIG. 5 is a schematic diagram illustrating a vicinity of a belt pulley of a driving apparatus according to a second example embodiment.

A second example embodiment will be described below. FIG. 5 is a schematic diagram illustrating a vicinity of a belt pulley of a driving apparatus according to the second example embodiment.

In the following description, only characteristic features of the present example embodiment will be described. In other respects, the configuration and operation are similar to those of the first example embodiment. A description thereof will thus be omitted.

As illustrated in FIG. 5, a belt pulley 130 is attached to a rotation shaft 111 of a motor 110 via a drive transmission member 120. A rotational movement of the rotation shaft 111 of the motor 110 thus drives the drive transmission member 120. The drive transmission member 120 engages with and drives the belt pulley 130 that is a drive output member. An endless belt 150 is attached to the belt pulley 130 that is the drive output member. The belt pulley 130 drives the endless belt 150 by the rotational movement transmitted from the motor 110.

The belt pulley 130 is divided into a pulley portion 130a and a drive transmission portion 130b. A flange 130h (end side) and a flange 130i (base side) are arranged on the respective sides of the pulley portion 130a. A deviation force acts on the endless belt 150. If a deviation force occurs in the direction toward the base side, the endless belt 150 moves to a position where the endless belt 150 makes contact with the flange 130i, and a deviation force F3 is generated. The drive transmission member 120 draws in the belt pulley 130 not to come off the rotation shaft 111 by a thrust force F1s. A drawing force of F3+F1s in total thus acts on the belt pulley 130. The belt pulley 130 is thereby retained not to come off the rotation shaft 111.

By contrast, if a deviation force occurs in the direction toward the end side, the endless belt 150 moves to a position where the endless belt 150 makes contact with the flange 130h, and a deviation force F4 is generated. As described above, the drive transmission member 120 draws in the belt pulley 130 not to come off the rotation shaft 111 by the thrust force F1s. A drawing force as much as a difference of F1s-F4 acts on the belt pulley 130. If the assumed maximum value of the deviation force F4 and the drawing force F1s of the drive transmission member 120 are set to the same value, the belt pulley 130 can be retained not to come off the rotation shaft 111. Similarly, if the drawing force F Is of the drive transmission member 120 is made greater than the assumed maximum value of the deviation force F4, the belt pulley 130 can be retained not to come off the rotation shaft 111. In consideration of safety, the forces can be set so that F1s>F4. The magnitude of F1s can be adjusted by changing an angle θ that engagement surfaces 121a and 130c form with respect to the rotation shaft 11l. The engagement surface 121a is a part of an engagement portion of the drive transmission member 120, and the engagement surface 130c is a part of an engagement portion of the belt pulley 130. The engagement surface 121a that is a part of the engagement portion of the drive transmission member 120 is a surface crossing the direction in which the belt pulley 130 comes off the rotation shaft 111. The crossing of the engagement surface 121a can suppress the movement of the belt pulley 130 in the coming-off direction.

In the present example embodiment, unlike the first example embodiment, a force in the direction A that is the direction in which the belt pulley 130 comes off does not constantly act on the belt pulley 130 that is the drive output member. More specifically, in configuration of the first example embodiment, a load in the direction A acts constantly on the drive output member. A load in a direction opposite to the direction A then needs to be constantly applied to the drive output member so that the drive output member does not come off the rotation shaft 11 of the motor 10. In the second example embodiment, a load in the direction A does not constantly act on the drive output member. The second example embodiment is an example embodiment demonstrating effectiveness in such a configuration.

Figure 6:
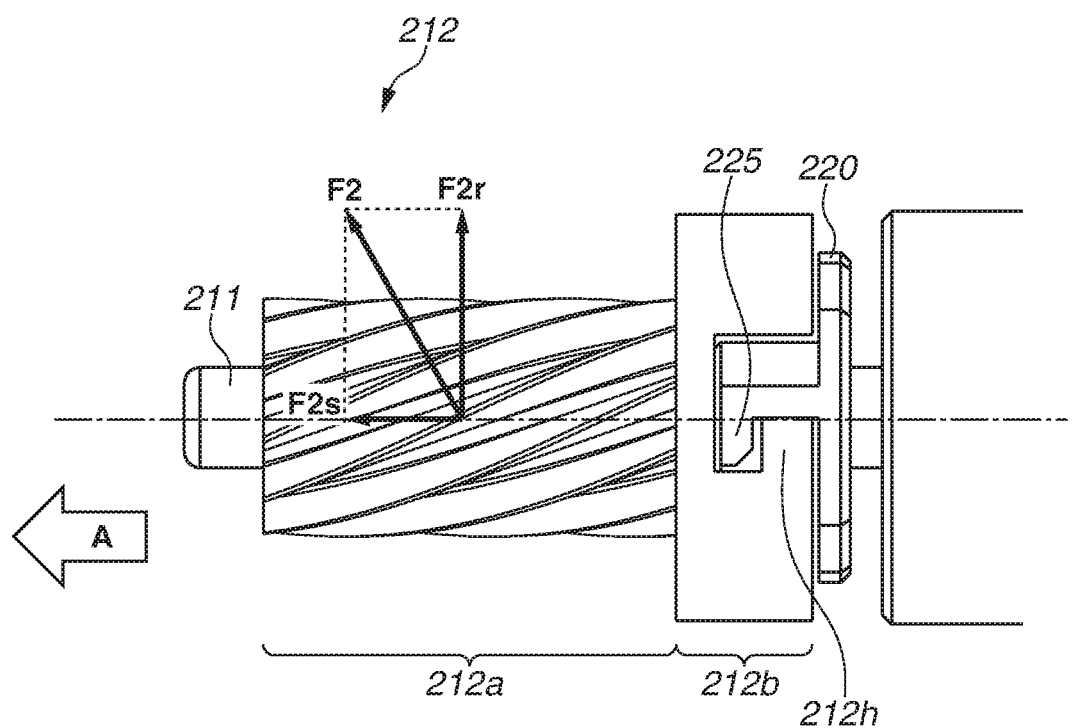
FIG. 6 is a schematic diagram illustrating a vicinity of a pinion gear of a driving apparatus according to a third example embodiment.

A third example embodiment will be described below. FIG. 6 is a schematic diagram illustrating a vicinity of a pinion gear of a driving apparatus according to the third example embodiment.

The following description deals only with characteristic features of the present example embodiment. In other respects, the configuration and operation are similar to those of the first example embodiment. A description thereof will thus be omitted.

As illustrated in FIG. 6, retaining portions 225 and 212h are provided on a drive transmission member 220 and a pinion gear 212 that is a drive output member, respectively. If a thrust-direction force F2s acts on the pinion gear 212 that is the drive output member in the direction A, the pinion gear 212 moves on a rotation shaft 211 in the direction A. The pinion gear 212 moves up to and stops at a position where the retaining portions 225 of the drive transmission member 220 and the retaining portions 212h of the pinion gear 212 make contact with each other. The retaining portions 225 and 212h can retain the pinion gear 212 on the rotation shaft 211 not to come off further. The retaining portion 225 of the drive transmission member 220 has a hook shape, and prevents the coming-off of the pinion gear 212 by hooking the retaining portion 212h of the pinion gear 211. The hook shape includes a first protrusion protruding from the base of the drive transmission member in the rotation axis direction of the motor, and a second protrusion protruding from the end of the first protrusion in a radial direction of the rotation circle of the rotation shaft 211. The retaining portion 212h of the pinion gear 212 has a recess corresponding to the hook shape of the retaining portion 225 of the drive transmission member 220.

The length of the drive transmission member 220 in the thrust direction increases as much as the retaining portion 225, compared to that of the first example embodiment where no retaining portion is used. A drive transmission portion 212b of the pinion gear 212 that is the drive output member is thus greater than the drive transmission portion 12b according to the first example embodiment. A gear portion 212a is thus shifted to the end side of the rotation shaft 211, whereas the pinion gear 212 can be retained on the rotation shaft 211 not to come off. The pinion gear 212 can thus be retained by pressing the rotation shaft 211 into the drive transmission member 220 and not pressing the rotation shaft 211 into the pinion gear 212. A driving apparatus having excellent maintainability can thus be provided.

Figure 8A:
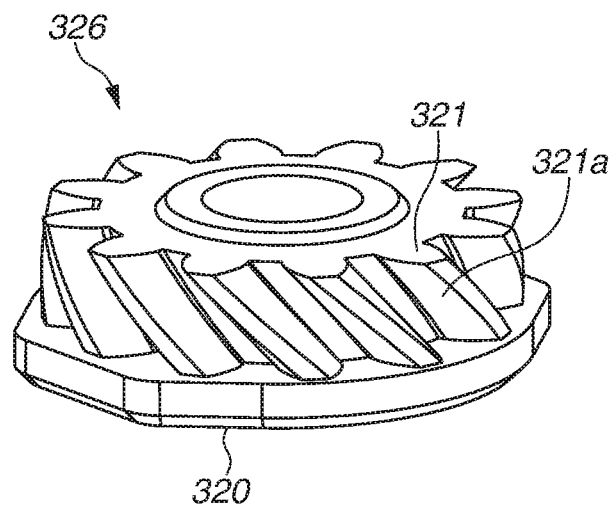
FIGS. 8A and 8B are perspective views of single parts of elements according to a fourth example embodiment.
Figure 8B:
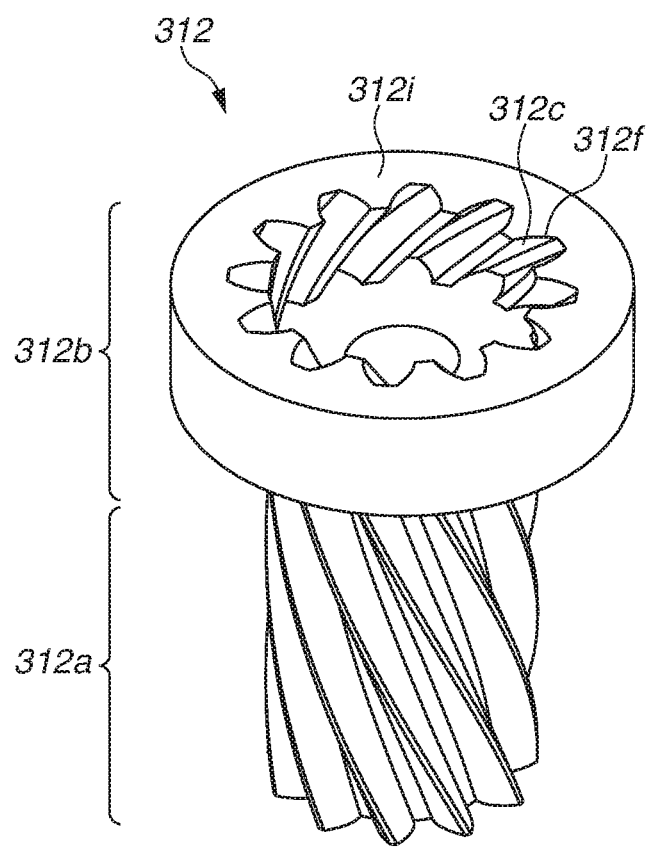

A fourth example embodiment will be described below. FIGS. 8A and 8B are perspective views of single parts of elements of a driving apparatus according to the fourth example embodiment.

In the following description, only characteristic features of the present example embodiment will be described. In other respects, the configuration and operation are similar to those of the first example embodiment. A description thereof will thus be omitted.

As illustrated in FIG. 8A, an external helical gear 326 including protrusions 321 is provided on a drive transmission member 320. As illustrated in FIG. 8B, an internal helical gear 312i including recesses 312f is provided in drive transmission portion 312b of a pinion gear 312 that is a drive output member.

The internal helical gear 312i may be referred to as a first helical gear, and the external helical gear 326 a second helical gear.

The external helical gear 326 is designed to have the same gear specifications, including the number of teeth, a twist direction, and a helix angle, as those of the internal helical gear 312i. The external helical gear 326 and the internal helical gear 312i mesh with each other, and gear tooth surfaces 321a and 312c engage with each other, whereby the drive transmission member 320 attached to a rotation shaft of a motor drives the pinion gear 312 that is the drive output member.

The external helical gear 326 of the drive transmission member 320 may be set to the same twist direction as that of a helical gear on a gear portion 312a of the pinion gear 312. The external helical gear 326 may be set to a helix angle greater than that of the helical gear on the gear portion 312a of the pinion gear 312.

With such a configuration, if the pinion gear 312 and a driven gear mesh to produce a force in the thrust direction in which the pinion gear 312 comes off as a driving reaction force, the external helical gear 326 and the internal helical gear 312i mesh with each other. Since the meshing causes the drive transmission member 320 to draw the pinion gear 312 by a force equal to or greater than the coming-off force, the pinion gear 312 can be retained not to come off the rotation shaft of the motor.

According to an example embodiment of the disclosure, a driving apparatus including a drive output member of excellent maintainability can be provided.

While the disclosure has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2018-024401, filed Feb. 14, 2018, which is hereby incorporated by reference herein in its entirety.

What is claimed is:

1. A driving apparatus comprising:
a motor including a rotation shaft;
a drive output member including helical teeth, arranged on the rotation shaft and configured to drive, as a driven member, a member to be driven; and
a drive transmission member fixed to the rotation shaft and configured to engage with the drive output member and drive the drive output member by rotation of the rotation shaft,
wherein, when the drive output member drives the driven member by meshing the helical teeth with the driven member, the drive output member receives a first force from the driven member in a direction in which the drive output member comes off the rotation shaft,
wherein, when the drive output member is driven by the drive transmission member, the drive output member receives a second force from the drive transmission member in a direction opposite to a direction of the first force, and
wherein the second force is equal to or greater than the first force.

2. A driving apparatus comprising:
a motor including a rotation shaft;
a helical gear arranged on the rotation shaft; and
a drive transmission member fixed to the rotation shaft and configured to drive the helical gear by rotation of the rotation shaft,
wherein the drive transmission member includes an engagement portion configured to engage with the helical gear, and
wherein the following relational expression is established:

$R2 \tan \theta \geq R1 \tan \phi$ where R1 is a distance from a contact point at which the engagement portion makes contact with the helical gear to the rotation shaft, θ is an angle formed between the engagement portion and the rotation shaft, R2 is a pitch circle radius of the helical gear, and φ is a helix angle of the helical gear.

3. A driving apparatus comprising:
a motor including a rotation shaft;
a drive output member configured to drive, as a driven member, a member to be driven arranged on the rotation shaft; and
a drive transmission member fixed to the rotation shaft and configured to engage with the drive output member and drive the drive output member by rotation of the rotation shaft,
wherein, when driving the driven member, the drive output member receives a load from the driven member in a direction in which the drive output member comes off the rotation shaft, and
wherein the drive transmission member includes a retaining portion configured to prevent the drive output member from coming off the rotation shaft.

4. A driving apparatus comprising:
a motor including a rotation shaft;
a first helical gear arranged on the rotation shaft, wherein the first helical gear includes a first helical gear portion and a second helical gear portion; and
a second helical gear configured to be fixed to the rotation shaft, wherein the second helical gear includes a third helical gear portion configured to engage with the second helical gear portion of the first helical gear,
wherein the third helical gear portion of the second helical gear has a helix angle equal to or greater than a helix angle of the first helical gear portion of the first helical gear.

5. The driving apparatus according to claim 1, wherein the drive transmission member includes an engagement surface tilted with respect to the rotation shaft.

6. The driving apparatus according to claim 5, wherein the drive transmission member includes a plurality of engagement members.

7. The driving apparatus according to claim 1,
wherein the drive output member is a helical gear,
wherein the helical gear has a meshing pitch circle radius greater than a distance from a contact point at which an engagement surface makes contact with the drive output member to a rotation center of the rotation shaft, and
wherein a helix angle of the helical gear and a tilt angle of the engagement surface are the same.

8. The driving apparatus according to claim 3, wherein the retaining portion has a hook shape.

9. The driving apparatus according to claim 1, wherein the drive transmission member is attached to the rotation shaft by press-in.

10. The driving apparatus according to claim 1, wherein the drive output member is attached to the rotation shaft without a fitting backlash.

11. The driving apparatus according to claim 1, wherein the drive output member is made of a resin.

12. The driving apparatus according to claim 1, wherein the drive transmission member includes a rotation stopper configuration.

13. The driving apparatus according to claim 1, wherein the motor is a direct-current (DC) brush motor.

14. An image forming apparatus comprising:
an image forming unit configured to form an image on a recording material; and
the driving apparatus according to claim 1.

15. An image forming apparatus comprising:
a photosensitive drum on which a latent image is to be formed;
a developing unit for developing the latent image into a toner image with toner; and
the driving apparatus according to claim 1,
wherein the driving apparatus is configured to drive the photosensitive drum.

16. The driving apparatus according to claim 4, wherein the second helical gear portion is an internal helical gear, and the third helical gear portion is an external helical gear.

* * * * *